(12) United States Patent
Gleeson et al.

(10) Patent No.: US 8,332,910 B2
(45) Date of Patent: Dec. 11, 2012

(54) METHOD AND APPARATUS FOR SELECTIVE DATA CONTROL

(75) Inventors: Eamon Patrick Gleeson, Atlanta, GA (US); Milton Lewiston Grant, Atlanta, GA (US); George Edward Williams, Niskayuna, NY (US); Scott Campbell Mattison, Salem, VA (US)

(73) Assignee: General Electric Company, Shenectady, NY (US)

( * ) Notice: Subject to any disclaimer, the term of this patent is extended or adjusted under 35 U.S.C. 154(b) by 1487 days.

(21) Appl. No.: 10/684,238

(22) Filed: Oct. 13, 2003

(65) Prior Publication Data

US 2005/0091393 A1   Apr. 28, 2005

(51) Int. Cl.
*H04L 29/06* (2006.01)

(52) U.S. Cl. ......................................... 726/2; 340/426.1

(58) Field of Classification Search .......................... None
See application file for complete search history.

(56) References Cited

U.S. PATENT DOCUMENTS

| | | | |
|---|---|---|---|
| 4,694,492 A | 9/1987 | Wirstrom et al. | |
| 5,604,528 A | 2/1997 | Edwards et al. | |
| 6,055,637 A | 4/2000 | Hudson et al. | |
| 6,108,656 A | 8/2000 | Durst et al. | |
| 6,127,922 A * | 10/2000 | Roddy et al. ............. | 340/426.14 |
| 6,259,367 B1 | 7/2001 | Klein | |
| 6,278,913 B1 * | 8/2001 | Jiang ................................. | 701/3 |
| 6,338,140 B1 | 1/2002 | Owens et al. | |
| 6,353,734 B1 * | 3/2002 | Wright et al. ................... | 455/98 |
| 6,389,337 B1 * | 5/2002 | Kolls .............................. | 701/29 |
| 6,460,141 B1 | 10/2002 | Olden | |
| 6,476,763 B2 * | 11/2002 | Allen, Jr. .................... | 342/357.1 |
| 6,609,201 B1 | 8/2003 | Folmsbee | |
| 6,647,328 B2 * | 11/2003 | Walker ............................ | 701/36 |
| 6,781,513 B1 * | 8/2004 | Korkosz et al. ............. | 340/539.1 |
| 6,882,917 B2 * | 4/2005 | Pillar et al. ....................... | 701/48 |
| 6,943,699 B2 * | 9/2005 | Ziarno .......................... | 340/945 |
| 7,039,120 B1 * | 5/2006 | Thoumy et al. ................ | 375/275 |
| 7,177,821 B2 | 2/2007 | Ikeda et al. | |
| 2002/0076050 A1 * | 6/2002 | Chen et al. ..................... | 380/231 |
| 2002/0152180 A1 | 10/2002 | Turgeon | |
| 2003/0028783 A1 | 2/2003 | Collins et al. | |
| 2003/0174844 A1 | 9/2003 | Candelore | |
| 2003/0188192 A1 | 10/2003 | Tang et al. | |

FOREIGN PATENT DOCUMENTS

| | | |
|---|---|---|
| JP | 06309278 A2 | 11/1994 |
| JP | 2001005786 A | 1/2001 |
| JP | 2002334167 A | 11/2002 |
| JP | 2003162319 A | 6/2003 |
| JP | 2003162320 A | 6/2003 |
| JP | 2003208217 A | 7/2003 |
| WO | 0174003 A1 | 10/2001 |

* cited by examiner

*Primary Examiner* — Benjamin Lanier
(74) *Attorney, Agent, or Firm* — Armstrong Teasdale LLP

(57) ABSTRACT

A method of selectively controlling communication between a supervisory processor and a subscriber is provided. The method includes receiving a stream of data at the supervisory processor, controlling transmission of the stream of data from the supervisory processor to the subscriber based on an associated supervisory processor configuration, receiving an enabling configuration at the supervisory processor which alters the supervisory processor configuration, and transmitting at least a portion of the controlled stream of data from the supervisory processor to the subscriber based on the supervisory processor configuration.

23 Claims, 4 Drawing Sheets

METHOD AND APPARATUS FOR SELECTIVE DATA CONTROL

BACKGROUND OF THE INVENTION

This invention relates generally to selective data communication, and more particularly, to methods and apparatus for selectively controlling data flow between a proprietary stream and a subscriber.

Gas turbine engines typically include a compressor section, a combustor section, and at least one turbine section. The compressor compresses air, which is mixed with fuel and channeled to the combustor. The mixture is then ignited thereby generating hot combustion gases. The combustion gases are channeled to the turbine which extracts energy from the combustion gases for powering the compressor, as well as producing useful work to power a load, such as an electrical generator, or to propel an aircraft in flight.

At least some known gas turbine engines are operated with advanced control systems that include proprietary data streams that transmit and receive data amongst various instruments and modules that make up the control system. Furthermore, to facilitate remote monitoring of the engines, proprietary data may be transmitted to a location that is remote from the facility including the engine and control system. Protecting such data from unauthorized reception facilitates preserving its proprietary value. Accordingly, within at least some known transmission systems, data is transmitted via dedicated communication lines from the data source to an end user. Other known systems encrypt or otherwise obfuscate the data prior to transmitting it, such that a decryption key is needed to view the transmitted data. However, in some cases it may be desirable to permit access to predetermined entities such as, customers and/or preauthorized maintenance service providers without requiring those entities to have a dedicated line for access to encrypted data.

BRIEF DESCRIPTION OF THE INVENTION

In one aspect, a method of selectively controlling communication between a supervisory processor and a subscriber is provided. The method includes receiving a stream of data at the supervisory processor, controlling transmission of the stream of data from the supervisory processor to the subscriber based on an associated supervisory processor configuration, receiving an enabling configuration at the supervisory processor which alters the supervisory processor configuration, and transmitting at least a portion of the controlled stream of data from the supervisory processor to the subscriber based on the supervisory processor configuration.

In another aspect, a data network is provided. The network includes a first proprietary network segment configured to receive proprietary data communication from a proprietary data source, a supervisory processor communicatively coupled to the first proprietary network wherein the processor is configured to execute software instructions based on a processor configuration, and a subscriber network segment coupled to the supervisory processor wherein the segment is configured to selectively transmit subscriber data from the supervisory processor to a subscriber.

In yet another aspect, a gas turbine control monitoring system for selectively transmitting gas turbine engine operational data from an engine supervisory processor to a subscriber is provided. The system includes a gas turbine control system communicatively coupled to at least one engine sensor, a first proprietary data network communicatively coupled to the gas turbine control system, a supervisory processor communicatively coupled to the first proprietary network for receiving gas turbine engine operational data, a second proprietary data network communicatively coupled to the supervisory processor, and a subscriber data network communicatively coupled to the supervisory processor, the processor is configured to selectively transmit gas turbine engine operational data to the subscriber through the subscriber data network.

DETAILED DESCRIPTION OF THE INVENTION

While the methods and apparatus are herein described in the context of gas turbine engine control systems used in an industrial environment, it is contemplated that the herein described method and apparatus may find utility in other data network applications including, but not limited to, commercial applications. The description hereinbelow is therefore set forth only by way of illustration rather than limitation.

Figure 1:
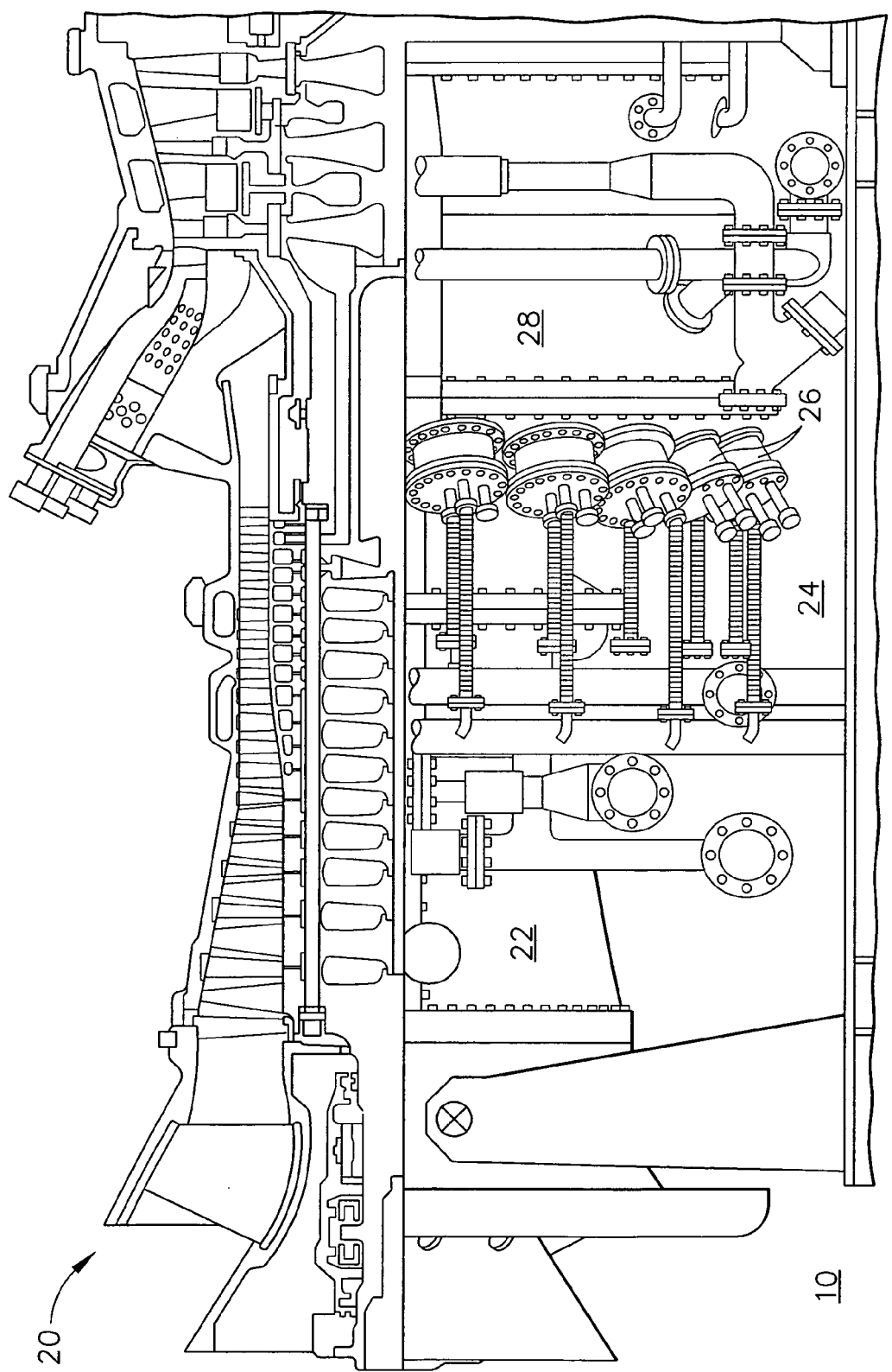
FIG. 1 is a side cutaway view of a gas turbine system that includes a gas turbine.

FIG. 1 is a side cutaway view of a gas turbine system 10 that includes a gas turbine 20. Gas turbine 20 includes a compressor section 22, a combustor section 24 including a plurality of combustors 26, and a turbine section 28 coupled to compressor section 22 using a shaft (not shown).

In operation, ambient air is channeled into compressor section 22 where the ambient air is compressed to a pressure greater than the ambient air. The compressed air is then channeled into combustor section 24 where the compressed air and a fuel are combined to produce a relatively high-pressure, high-velocity gas. Turbine section 28 is configured to extract and the energy from the high-pressure, high-velocity gas flowing from combustor section 24. The combusted fuel mixture produces a desired form of energy, such as, for example, electrical, heat and mechanical energy. In one embodiment, the combusted fuel mixture produces electrical energy measured in kilowatt-hours (kWh). However, the present invention is not limited to the production of electrical energy and encompasses other forms of energy, such as, mechanical work and heat. Gas turbine system 10 is typically controlled, via various control parameters, from an automated and/or electronic control system (not shown) that is attached to gas turbine system 10.

Figure 2:
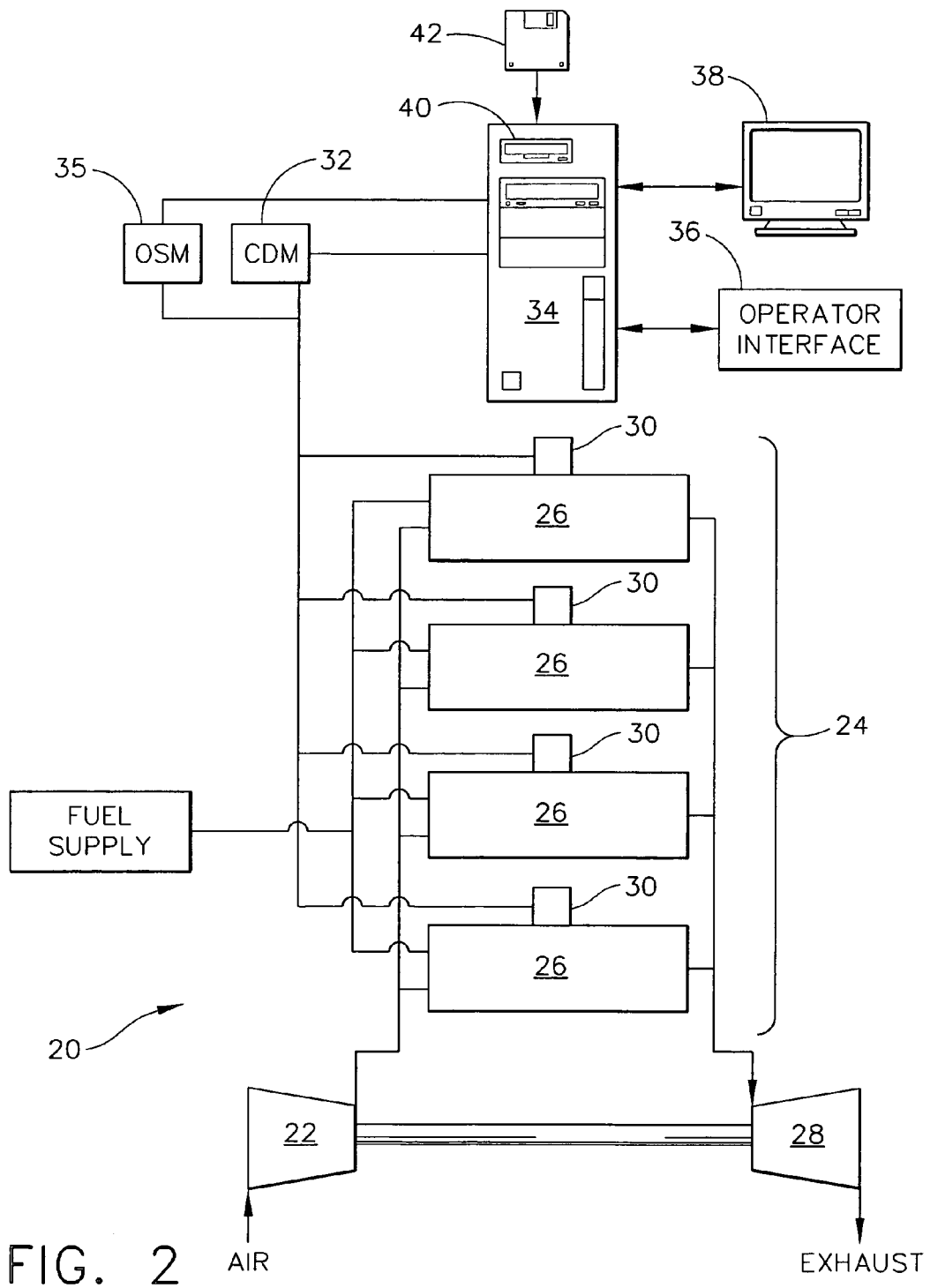
FIG. 2 is a schematic illustration the gas turbine system shown in FIG. 1.

FIG. 2 is a simplified schematic illustration of gas turbine system 10 shown in FIG. 1. Gas turbine system 10 also includes a plurality of sensors 30 electrically coupled to gas turbine 20. A combustion dynamics monitor (CDM) 32 samples analog data from sensors 30 and converts the analog data to digital signals for subsequent processing. A computer 34 receives the sampled and digitized sensor data from at least one of CDM 32 and an On-Site Monitor (OSM) 35, and performs high-speed data analysis. OSM 35 may also include a PI/UDP turbine control system data server that executes on OSM 35 to transmit control system data to through a network. Although only four combustors 26 are shown, it should be realized that gas turbine engine 20 can include more or less than four combustors 26, for example, in one exemplary embodiment, gas turbine engine 20 includes twenty-seven combustors 26.

Computer 34 receives commands from an operator via an operator interface 36. An associated monitor 38 such as, but not limited to, a liquid crystal display (LCD) and a cathode ray tube, allows the operator to observe data received from computer 34. The operator supplied commands and parameters are used by computer 34 to provide control signals and information to CDM 32 and OSM 35.

In one embodiment, computer 34 includes a device 40, for example, a floppy disk drive, CD-ROM drive, DVD drive, magnetic optical disk (MOD) device, or any other digital device including a network connecting device such as an Ethernet device for reading instructions and/or data from a computer-readable medium 42, such as a floppy disk, a CD-ROM, a DVD or an other digital source such as a network or the Internet, as well as yet to be developed digital means. In another embodiment, computer 34 executes instructions stored in firmware (not shown). Computer 34 is programmed to perform functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

Figure 3:
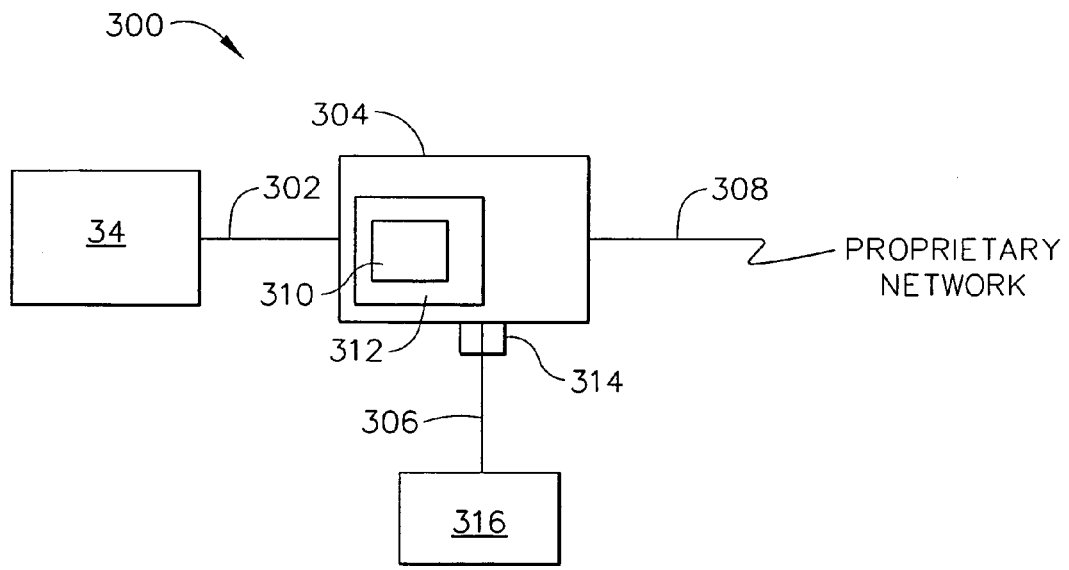
FIG. 3 is a schematic illustration of an exemplary architecture of a network 300 that may be used with the gas turbine system shown in FIG. 1.

FIG. 3 is a schematic illustration of an exemplary architecture of a network 300 that may be used with gas turbine system 10 shown in FIG. 1. In the exemplary embodiment, network 300 includes a first proprietary network segment 302, a supervisory processor 304 communicatively coupled to first proprietary network 302, and a subscriber network segment 306 coupled to supervisory processor 304. In an alternative embodiment, network 300 also includes a second proprietary data network segment 308 that is communicatively coupled to supervisory processor 304. As used herein, "proprietary network" is used to describe a limited access network that is owned and operated by a single business entity or by a limited number of cooperative business entities. "Proprietary data" is used to describe data that is owned by a business entity that may take measures to prevent unauthorized access to such data. Such measures may include, but are not limited to, transmitting the proprietary data on a proprietary network and/or obfuscating the data before transmitting the data over a network. The business entity may also transmit unobfuscted proprietary data over a commercial network.

First proprietary network segment 302 may be configured to receive proprietary data communication from a proprietary data source, such as, but not limited to, computer 34. In the exemplary embodiment, proprietary network segment 302 is an Ethernet segment with limited access controlled by the proprietary network owner. In one embodiment, data transmitted through segment 302 is not obfuscated and may rely upon limited-access of the network for data confidentiality. In another embodiment, data transmitted through segment 302 is obfuscated at the data source, such as computer 34, such that an unauthorized user intercepting the data communication would have difficulty extracting intelligible data from segment 302.

Supervisory processor 304 is communicatively coupled to the first proprietary network and is configured to execute software instructions based on a processor configuration 310. Configuration 310 may be embodied as a computer file that may reside in a memory 312 of processor 304. Memory 312 may, for example, be volatile, such as, a random access memory (RAM). In alternative embodiments, other forms of memory may be used, including but not limited, to flash memory (FLASH), programmable read only memory (PROM), and electronically erasable programmable read only memory (EEPROM). Configuration 310 may also be embodied as a processor register or other memory location of processor 304.

Subscriber network segment 306 may be coupled to the supervisory processor through a processor or communications card port 314, and segment 306 is configured to transmit subscriber data from supervisory processor 304 to a subscriber processor 316. In one embodiment, subscriber processor 316 includes a client application that is programmed to receive obfuscated data from supervisory processor 304 and deobfuscate the data for presentation to the subscriber in a predetermined format. Receipt and deobfuscation of the data may also be selectively controlled by the subscriber.

In the exemplary embodiment, second proprietary data network segment 308 is a proprietary WAN, such as, a network with limited access points that is owned and operated by a single business entity or by a limited number of cooperative business entities.

In operation, processor 304 receives proprietary data from a data source such as computer 34, and transmits the data to segment 308. Processor 304 also determines from configuration 310 whether to transmit the data to subscriber segment 306. Processor may transmit the data to segment 306 by enabling port 314 to a transmit state, by deobfuscating the data at port 314 if the data is obfuscated, and/or by routing the data to port 314. The transmission of data is selective to allow control of the data by the data owner to a subscriber of the data. In the exemplary embodiment, the owner is the gas turbine engine original equipment manufacturer (OEM) and the subscriber is the engine owner, such as, a utility, independent power producer, or industrial facility. The engine may operate with proprietary data collection systems using proprietary algorithms. To protect the data, a method such as described herein may be employed. In some known cases, the OEM and the engine owner enter into a technology sharing agreement wherein the owner is granted access rights to the data for the owner's own use. In such a case, the OEM may "turn on" the data for the owner's use. When the owner violates terms of the agreement the OEM may "turn off" the data, such that the owner is no longer able to use the data. The OEM may "turn off" the data by sending a command through segment 308 that alters configuration 310. The OEM may enter a command locally at processor 304 that alters configuration 310, or configuration 310 may be altered automatically at the expiration of a predetermined time period.

In the exemplary embodiment, segment 308 is a private intranet for communicating gas turbine control system tuning information between remote turbine sites and tuning engineers located at a home office or other remote turbine sites. In an alternative embodiment, segment 308 is the Internet.

Figure 4:
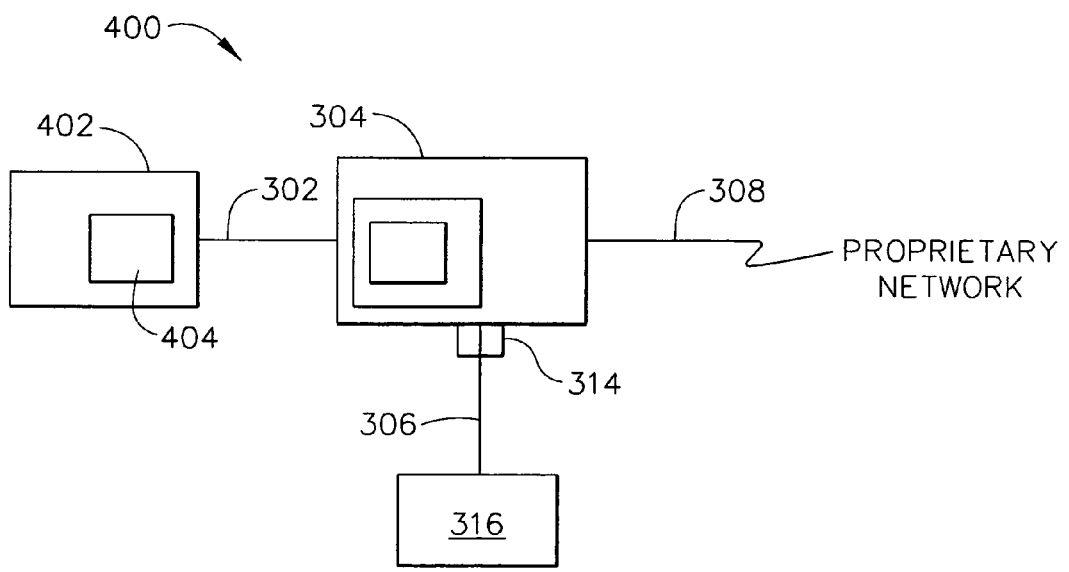
FIG. 4 is a schematic illustration of an alternate architecture of a network 400 that may be used with the gas turbine system shown in FIG. 1.

FIG. 4 is a schematic illustration of an alternate architecture of a network 400 that may be used with gas turbine system 10 shown in FIG. 1. Components of network 400 that are identical to components of network 300 (shown in FIG. 3) are identified in FIG. 4 using the same reference numerals used in FIG. 3. Accordingly, network 400 includes a first proprietary network segment 302, a supervisory processor 304 communicatively coupled to first proprietary network 302, and a subscriber network segment 306 coupled to supervisory processor 304. In an alternative embodiment, network 400 also includes a second proprietary data network segment 308 that is communicatively coupled to supervisory processor 304.

First proprietary network segment 302 may be configured to receive proprietary data communication from a proprietary data source, such as, but not limited to, gas turbine control system 402. In the exemplary embodiment, proprietary network segment 302 is an Ethernet segment. Data transmitted through segment 302 is obfuscated at gas turbine control system 402 by an obfuscator 404, such that an unauthorized user intercepting the data communication would have difficulty extracting intelligible data from gas turbine control system 402 or segment 302. Obfuscator 404 may be embodied in software executing within system 402 or may be a hardware or firmware implementation of a suitable obfuscation algorithm.

Supervisory processor 304 is communicatively coupled to the first proprietary network and is configured to execute software instructions based on processor configuration 310. Configuration 310 may be embodied as a computer file that may reside in a memory 312 of processor 304. Memory 312 may, for example, be volatile, such as, a random access memory (RAM). In alternative embodiments, other forms of memory may be used, including but not limited, to flash memory (FLASH), programmable read only memory (PROM), and electronically erasable programmable read only memory (EEPROM). Configuration 310 may also be embodied as a processor register or other memory location of processor 304.

Subscriber network segment 306 may be coupled to the supervisory processor through a processor or communications card port 314, and segment 306 is configured to transmit subscriber data from supervisory processor 304 to a subscriber (not shown).

In the exemplary embodiment, second proprietary data network segment 308 is a proprietary WAN, such as, a network with limited access points that is owned and operated by a single business entity or by a limited number of cooperative business entities.

In operation, processor 304 receives proprietary data from a data source such as control computer 402, and transmits the data to segment 308. Processor 304 also determines from configuration 310 whether to transmit the data to subscriber segment 306. Processor may transmit the data to segment 306 by enabling port 314 to a transmit state, by deobfuscating the data at port 314, and/or by routing the data to port 314. The transmission of data is selective to allow control of the data by the data owner to a subscriber of the data. In the exemplary embodiment, the owner is the gas turbine engine original equipment manufacturer (OEM) and the subscriber is the engine owner, such as, a utility, independent power producer, or industrial facility. The engine may operate with proprietary data collection systems using proprietary algorithms. To protect the data, a method such as described herein may be employed. In some known cases, the OEM and the engine owner enter into a technology sharing agreement wherein the owner is granted access rights to the data for the owner's own use. In such a case, the OEM may "turn on" the data for the owner's use. When the owner violates terms of the agreement the OEM may "turn off" the data, such that the owner is no longer able to use the data. The OEM may "turn off" the data by sending a command through segment 308 that alters configuration 310. The OEM may enter a command locally at processor 304 that alters configuration 310, or configuration 310 may be altered automatically at the expiration of a predetermined time period.

In the exemplary embodiment, segment 308 is a private intranet for communicating gas turbine control system tuning information between remote turbine sites and tuning engineers located at a home office or other remote turbine sites. In an alternative embodiment, segment 308 is the Internet.

Figure 5:
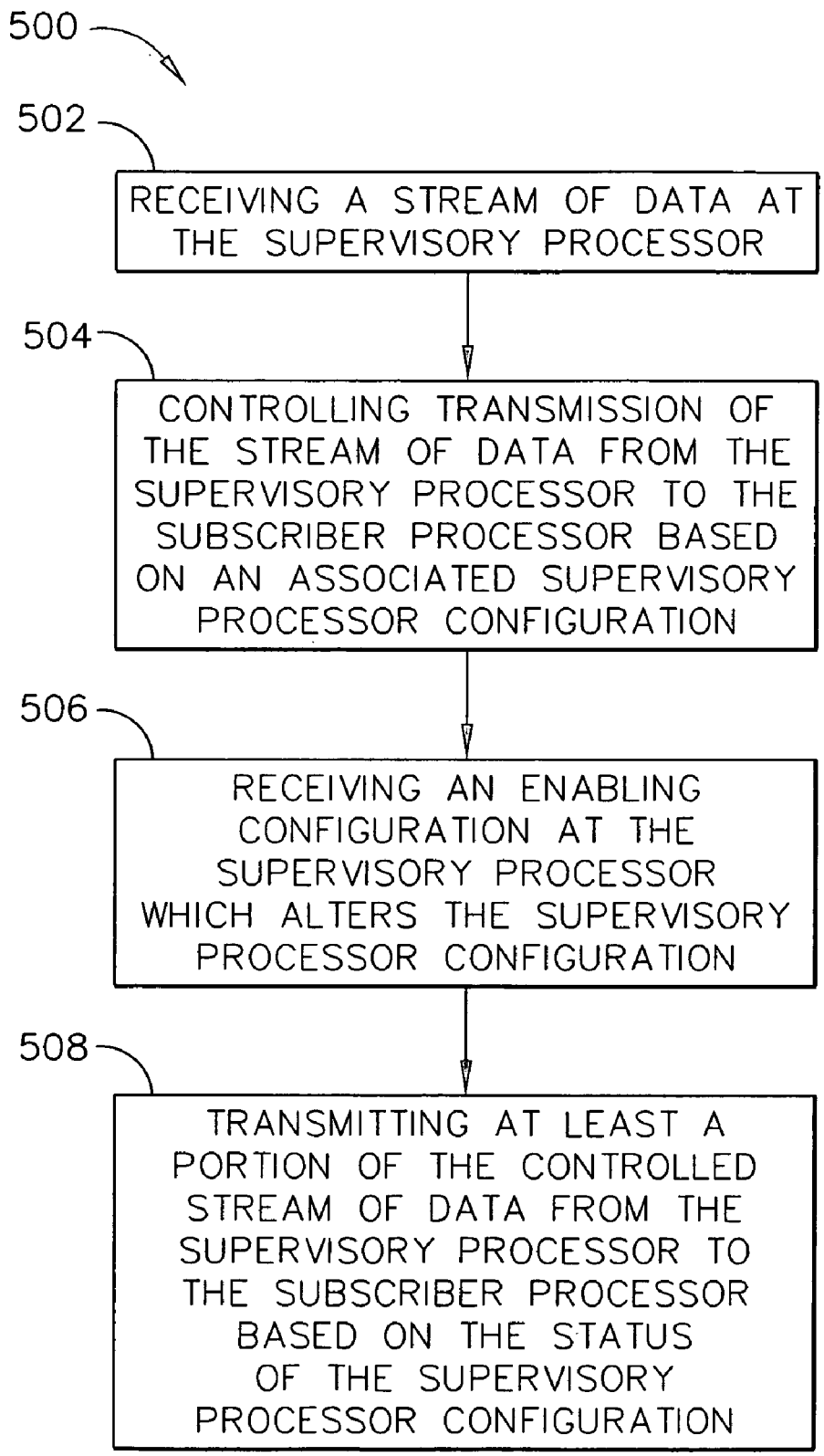
FIG. 5 is a block diagram of an exemplary method that may be used to control data access to the network shown in FIG. 3 and the network shown in FIG. 4.

FIG. 5 is a block diagram of an exemplary method 500 that may be used to control data access to network 300 (shown in FIG. 3) and network 400 (shown in FIG. 4). Method 500 includes receiving 502 a first stream of data at supervisory processor 304. The data may be obfuscated by gas turbine control system 402, or may not be obfuscated by the data source, such as in one embodiment of computer 34. In the exemplary embodiment, the data is transmitted using an Ethernet protocol. In other embodiments, other data transmission protocols may be used. Transmission of the stream of data from the supervisory processor to the subscriber may be controlled 504 based on the supervisory processor configuration, for example, a subscriber may not have paid for access to the data, has allowed a subscription to lapse, or has otherwise violated the terms of an agreement between the subscriber and the data owner. In such a case as the subscriber desires access to the data and meets the terms of the agreement, processor 304 may receive 506 an enabling configuration that alters the supervisory processor configuration. Processor 304 recognizes the configuration instruction as enabling transmission of data received from segment 302 to segment 306. When processor 304 receives further streams of data, processor 304 will transmit 508 at least a portion of the further streams of data from supervisory processor 304 to the subscriber.

The above-described methods and systems provide a cost-effective and reliable means for monitoring gas turbine operational parameters including combustion dynamics. More specifically, the methods and systems facilitate selectively transmitting gas turbine control system data from a gas turbine control system or a gas turbine monitoring system to a subscriber of the data. As a result, the methods and systems described herein facilitate monitoring and maintaining gas turbine engines in a cost-effective and reliable manner.

Exemplary embodiments of gas turbine engine monitoring systems and communications systems are described above in detail. The systems are not limited to the specific embodiments described herein, but rather, components of each system may be utilized independently and separately from other components described herein. Each system component can also be used in combination with other system components.

While the invention has been described in terms of various specific embodiments, those skilled in the art will recognize that the invention can be practiced with modification within the spirit and scope of the claims.

What is claimed is:

1. A method of selectively controlling communication between a data source and a subscriber, said method comprising:
 receiving, from the data source, a stream of obfuscated data at a supervisory processor wherein the data source is a computer coupled to a gas turbine system;
 deobfuscating the obfuscated data in the stream;
 enabling the subscriber to have access to the stream of data;
 controlling transmission of the stream of data from the supervisory processor to the subscriber based on a configuration of the supervisory processor, wherein controlling transmission of the stream of data comprises selectively deobfuscating the obfuscated data in the stream;

determining that the subscriber has failed to satisfy at least one predefined obligation in a data sharing agreement between an owner of the stream of data and the subscriber; and receiving a disabling configuration instruction at the supervisory processor which alters the configuration of the supervisory processor, wherein the altered configuration of the supervisory processor renders the stream of data that is accessible by the subscriber unusable by the subscriber by not deobfuscating the obfuscated data in the stream.

2. A method in accordance with claim 1 further comprising transmitting a plurality of process system data from a process control system.

3. A method in accordance with claim 1 wherein controlling transmission of the stream of data from the supervisory processor to the subscriber comprises transmitting data to a subscriber access port on the supervisory processor without deobfuscating the data.

4. A method in accordance with claim 1 wherein an enabling configuration of the supervisory processor expires after a predetermined time period, such that the supervisory processor configuration is altered upon expiration of the enabling configuration.

5. A method in accordance with claim 1 wherein the supervisory processor is at least one of a gas turbine engine data acquisition system and a gas turbine engine on-site monitor said method further comprising receiving a stream of operational data via an operator interface at the supervisory processor.

6. A method in accordance with claim 5 wherein receiving a stream of gas turbine operational data comprises receiving a stream of gas turbine operational data that includes at least one of combustor dynamics data and gas turbine data.

7. A data network comprising:
a first proprietary network segment configured to receive proprietary data communication that is obfuscated from a proprietary data source, wherein the proprietary data source comprises a computer coupled to a gas turbine system;
a supervisory processor communicatively coupled to said first proprietary network segment, said processor configured to execute software instructions based on a processor configuration, said processor configured to selectively transmit subscriber data by selectively deobfuscating the subscriber data; and
a subscriber network segment coupled to said supervisory processor, said subscriber network segment configured to enable a subscriber to access a transmission of subscriber data that is deobfuscated and render a transmission of the subscriber data that is accessible by the subscriber from said supervisory processor unusable by not deobfuscating the subscriber data if it is determined that the subscriber has failed to satisfy at least one predefined obligation in a data sharing agreement between an owner of the subscriber data and the subscriber.

8. A data network in accordance with claim 7 further comprising a second proprietary data network segment communicatively coupled to said supervisory processor, said second proprietary data network segment configured to transmit proprietary data from said supervisory processor to a proprietary wide area network (WAN).

9. A data network in accordance with claim 8 wherein said second proprietary data network segment transmits data that is unobfuscated.

10. A data network in accordance with claim 8 wherein said processor is further configured to:

receive proprietary data from said first proprietary network segment;
transmit proprietary data to said second proprietary data network segment;
alter the processor configuration based on commands received from said second proprietary data network segment; and
transmit subscriber data to said subscriber network segment based on the processor configuration.

11. A data network in accordance with claim 7 wherein said supervisory processor comprises a subscriber data port, said subscriber data port is configurable to deobfuscate data in a first state, and to prevent deobfuscation of data in a second state, wherein the second state is different than the first state.

12. A data network in accordance with claim 11 wherein said supervisory processor is further configured to alter a state of said subscriber data port based on the processor configuration.

13. A data network in accordance with claim 11 wherein said supervisory processor is further configured to alter the state of said subscriber data port based on a remotely-received processor command.

14. A data network in accordance with claim 11 wherein said supervisory processor is configured to alter the state of said subscriber data port based on a locally received processor command.

15. A gas turbine control monitoring system for selectively transmitting gas turbine engine operational data from a supervisory processor to a subscriber, said system comprising:
a gas turbine control system communicatively coupled to at least one engine sensor;
a first proprietary data network communicatively coupled to the gas turbine control system;
said supervisory processor communicatively coupled to said first proprietary network for receiving gas turbine engine operational data that is obfuscated;
a second proprietary data network communicatively coupled to said supervisory processor; and
a subscriber data network communicatively coupled to said supervisory processor, wherein said supervisory processor is configured to transmit gas turbine engine operational data that is deobfuscated to the subscriber through said subscriber data network, and wherein the gas turbine engine operational data transmitted from said supervisory processor to said subscriber is altered and rendered unusable by not deobfuscating the gas turbine engine operational data if it is determined that the subscriber has failed to satisfy at least one predefined obligation in a data sharing agreement between an owner of the gas turbine engine operational data and the subscriber.

16. A gas turbine control monitoring system in accordance with claim 15 wherein said supervisory processor receives the gas turbine engine operational data including combustor dynamics data.

17. A gas turbine control monitoring system in accordance with claim 15 wherein said gas turbine control system obfuscates at least a portion of the gas turbine control system data.

18. A gas turbine control monitoring system in accordance with claim 15 wherein said supervisory processor further receives obfuscated data from said gas turbine control system through said first proprietary network.

19. A gas turbine control monitoring system in accordance with claim 15 wherein said supervisory processor is further configured to selectively transmit data to said second proprietary data network.

20. A gas turbine control monitoring system in accordance with claim 15 wherein said supervisory processor is further configured to selectively transmit data to said second proprietary data network based on a supervisory processor configuration.

21. A gas turbine control monitoring system in accordance with claim 15 wherein said supervisory processor comprises a subscriber port having a first transmitting state, and a second non-transmitting state, said supervisory processor is further configured to selectively alter the state of said port based on a supervisory processor configuration.

22. A gas turbine control monitoring system in accordance with claim 15 wherein said supervisory processor is further configured to receive a proprietary command from said second proprietary data network wherein the command instructs said supervisory processor to alter the processor configuration.

23. A gas turbine control monitoring system in accordance with claim 15 wherein said supervisory processor is further configured to receive a proprietary command from a local input device wherein the command instructs said supervisory processor to alter the processor configuration.

* * * * *